United States Patent
Lee et al.

(10) Patent No.: US 9,481,408 B2
(45) Date of Patent: Nov. 1, 2016

(54) VARIABLE DEFLECTOR APPARATUS FOR SIDE STEP OF VEHICLE

(71) Applicant: Hyundai Motor Company, Seoul (KR)

(72) Inventors: Seung Mok Lee, Osan-si (KR); Young Sub Oh, Suwon-si (KR); Jin Young Yoon, Gimpo-si (KR); Bock Cheol Lee, Suwon-si (KR); Hyun Gyung Kim, Hwaseong-si (KR); Dong Eun Cha, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/820,279

(22) Filed: Aug. 6, 2015

(65) Prior Publication Data

US 2016/0264193 A1  Sep. 15, 2016

(30) Foreign Application Priority Data

Mar. 13, 2015  (KR) .......................... 10-2015-0034803

(51) Int. Cl.
| | |
|---|---|
| *B60R 3/02* | (2006.01) |
| *B62D 37/02* | (2006.01) |
| *B62D 35/00* | (2006.01) |
| *B60R 3/00* | (2006.01) |

(52) U.S. Cl.
CPC .............. *B62D 35/001* (2013.01); *B60R 3/002* (2013.01)

(58) Field of Classification Search
CPC ......... B60R 3/00; B60R 3/002; B60R 3/007; B60R 3/02; B62D 37/02; B62D 35/008
See application file for complete search history.

(56) References Cited

U.S. PATENT DOCUMENTS

| | | | | |
|---|---|---|---|---|
| 7,900,944 | B2* | 3/2011 | Watson | ..................... B60R 3/02 |
| | | | | 280/166 |
| 9,073,486 | B1* | 7/2015 | Meszaros | ................ B60R 3/002 |
| 2014/0183835 | A1* | 7/2014 | Cha | ........................... B60R 3/02 |
| | | | | 280/166 |

FOREIGN PATENT DOCUMENTS

| | | |
|---|---|---|
| JP | 6-20174 U | 3/1994 |
| JP | 6-305452 A | 11/1994 |
| JP | 2008-260401 A | 10/2008 |
| JP | 2009-107446 A | 5/2009 |
| JP | 2014-84035 A | 5/2014 |
| KR | 10-1999-0017451 | 3/1999 |
| KR | 10-2005-0031491 A | 4/2005 |
| KR | 10-2011-0098881 A | 9/2011 |

* cited by examiner

*Primary Examiner* — Bryan Evans
(74) *Attorney, Agent, or Firm* — Morgan, Lewis & Bockius LLP

(57) ABSTRACT

A variable deflector apparatus for a side step of a vehicle may include a slide plate receiving power from a drive device to be received in and drawn out from the side step, and a side-step deflector comprising a plurality of joints connected to each other in a row to be coupled with the slide plate and folded or unfolded with respect to a junction of each of the joints, in which the side-step deflector is configured to be received together with the slide plate when it is received in the side step and to be drawn out together with the slide plate and simultaneously separated therefrom when the slide plate is drawn out from the side step, and a drawn-out portion of the side-step deflector separated from the slide plate is configured to be perpendicularly deployed downwards from the side step, thus improving aerodynamic performance of the vehicle.

7 Claims, 6 Drawing Sheets

VARIABLE DEFLECTOR APPARATUS FOR SIDE STEP OF VEHICLE

CROSS-REFERENCE(S) TO RELATED APPLICATION

The present application claims priority to Korean Patent Application No. 10-2015-0034803, filed Mar. 13, 2015, the entire contents of which is incorporated herein for all purposes by this reference.

BACKGROUND OF THE INVENTION

1. Field of the Invention

The present invention relates to a variable deflector apparatus for a side step of a vehicle. More particularly, the invention relates to a variable deflector apparatus for a side step of a vehicle, which is capable of improving aerodynamic performance of the vehicle equipped with the side step.

2. Description of Related Art

A recreational vehicle (RV) that is higher in height than a passenger vehicle is provided with a side step 100 as shown in FIG. 1, for the purpose of allowing a passenger to get on or off.

As such, since the vehicle equipped with the side step 100 is mainly configured such that the side step 100 is fixedly mounted to a vehicle body 200 (side sill panel), the aerodynamic performance of the vehicle is deteriorated due to the side step 100 protruding laterally when the vehicle is being driven, and consequently, fuel efficiency is undesirably reduced.

BRIEF SUMMARY

Various aspects of the present invention are directed to providing a variable deflector apparatus, which is mounted to a side step so as both enhance the aerodynamic performance of a vehicle equipped with the side step and improve fuel efficiency.

Further, various aspects of the present invention are directed to providing a variable deflector apparatus for a side step, which is received in the side step before an operation to reinforce the side step and is drawn out perpendicularly from the side step during the operation to improve the aerodynamic performance of the vehicle.

Various aspects of the present invention are additionally directed to providing a variable deflector apparatus mounted to a side step, in which an extent to which the apparatus is drawn out from the side step depending on a vehicle speed is automatically adjusted, thus optimally improving the aerodynamic performance of a vehicle.

According to various aspects of the present invention, a variable deflector apparatus for a side step of a vehicle may include a slide plate receiving power from a drive device to be received in and drawn out from the side step, and a side-step deflector comprising a plurality of joints connected to each other in a row to be coupled with the slide plate and to be folded or unfolded with respect to a junction of each of the joints, in which the side-step deflector may be configured to be received together with the slide plate when it is received in the side step and to be drawn out together with the slide plate and simultaneously separated therefrom when the slide plate is drawn out from the side step, and a drawn-out portion of the side-step deflector separated from the slide plate may be configured to be perpendicularly deployed downwards from the side step, thus improving aerodynamic performance of the vehicle.

The variable deflector apparatus may further include a vehicle-speed sensor, and a controller configured to receive a signal from the vehicle-speed sensor to control an operation of the drive device.

The drive device may include a motor fixedly mounted to a vehicle body in an indoor direction of the vehicle, and a pinion gear coupled to a shaft of the motor, and the slide plate may include a rack gear integrally formed on an underside thereof to engage with the pinion gear.

When the side-step deflector is received in the side step, a last joint in an outdoor direction of the vehicle may be coupled to the slide plate and the remaining joints may maintain a close contact state with the slide plate to be separable therefrom.

The side step may define a receiving space therein and may have, at an end in the indoor direction facing the pinion gear, an opening that is connected to the receiving space, and the slide plate and the side-step deflector may be configured to be received in or drawn out through the opening.

A guide groove may be formed on a side of each of front and rear ends in the receiving space of the side step, in a direction where the side step protrudes laterally, and the side-step deflector may be fitted at a side of each of front and rear ends thereof into the guide groove when the side-step deflector is received in or drawn out, and a portion of the side-step deflector fitted into the guide groove may be in close contact with the slide plate to prevent the side-step deflector from sagging.

A number of joints of the side-step deflector that are configured to be perpendicularly deployed downwards from the side step may be increased, as a vehicle speed increases.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A conventional vehicle equipped with a side step 100 protruding laterally from a vehicle body 200 (side sill panel) has drawbacks in that the aerodynamic performance of the vehicle is deteriorated due to the side step 100 protruding laterally when the vehicle is being driven, and fuel efficiency is also reduced. Therefore, the present invention is intended to improve the aerodynamic performance of the vehicle equipped with the side step using a variable deflector.

Figure 1:
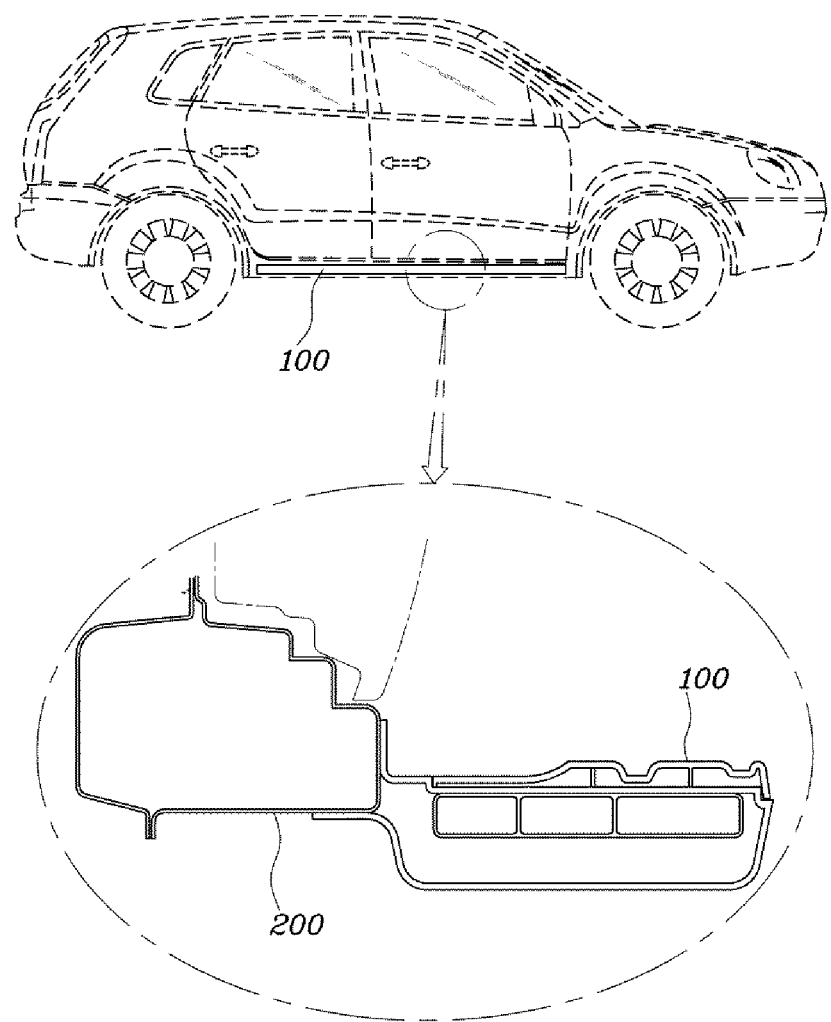
FIG. 1 is a view illustrating a conventional side step having no deflector.
Figure 2:
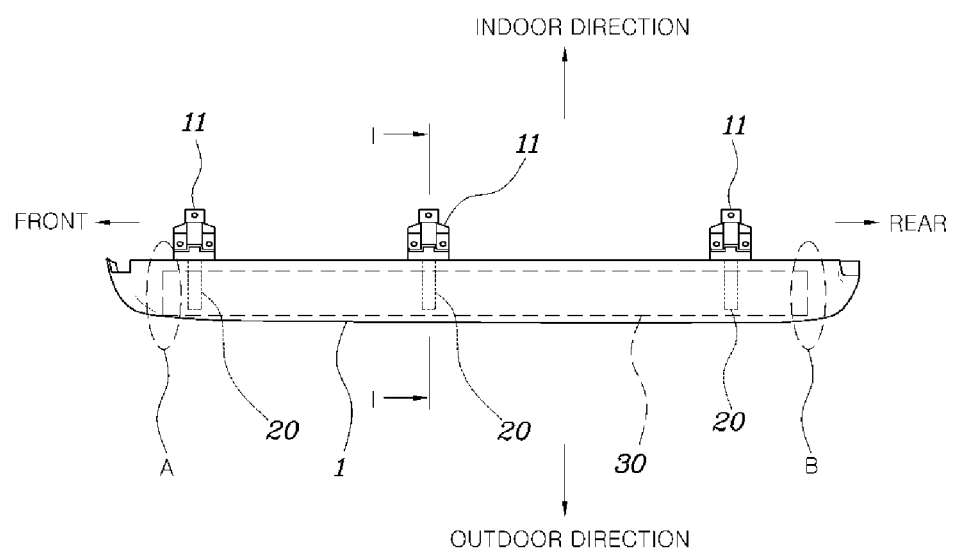
FIG. 2 is a plan view showing a side step of a vehicle equipped with an exemplary variable deflector apparatus according to the present invention.
Figure 3:
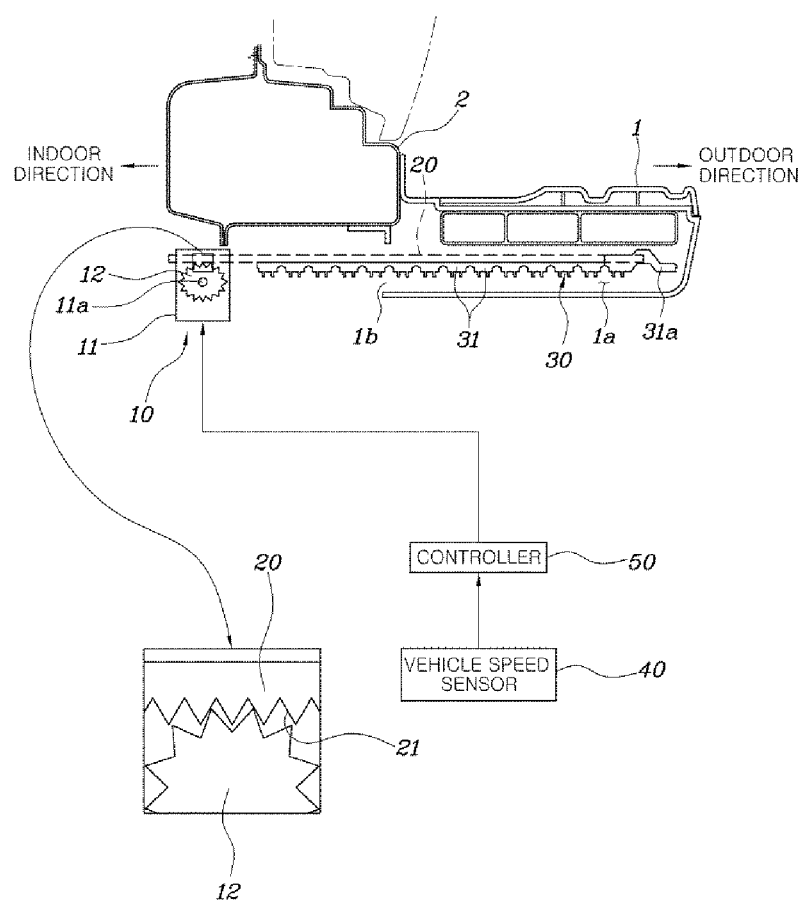
FIG. 3 is a sectional view taken along line I-I of FIG. 2.
Figure 4:
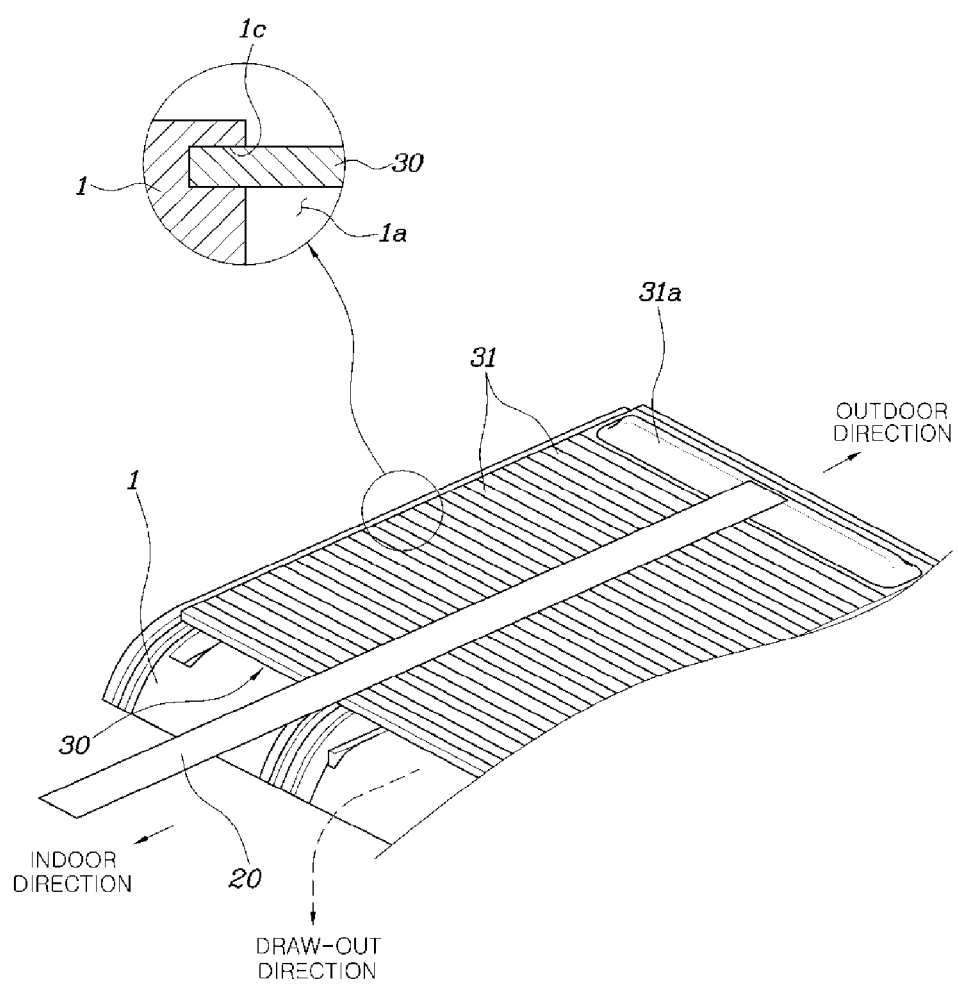
FIG. 4 and FIG. 5 are enlarged views showing portion A and portion B of FIG. 2, to illustrate a state in which a slide plate and a deflector are mounted.
Figure 5:
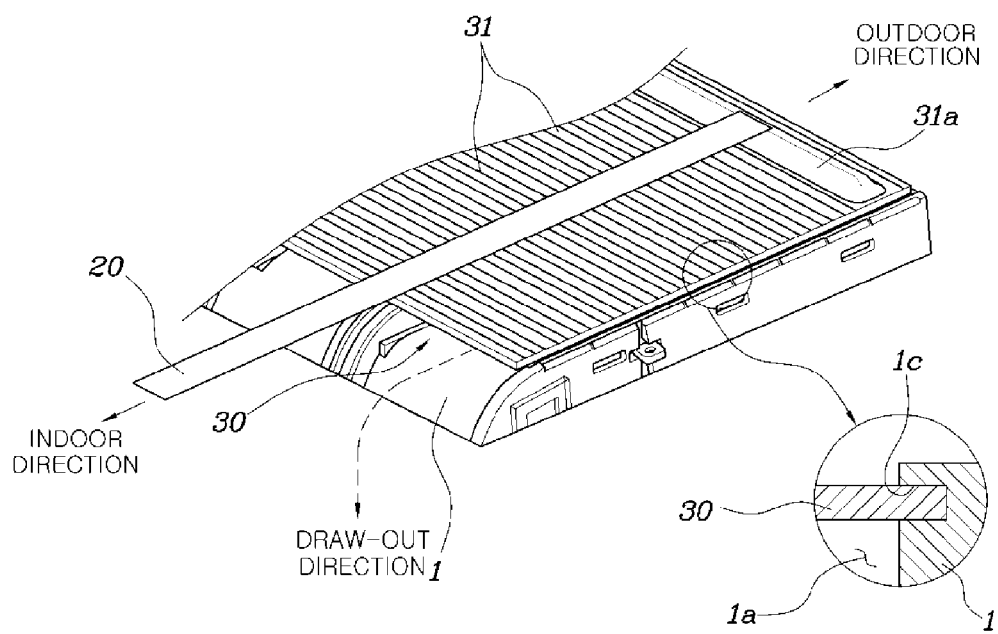
Figure 6:
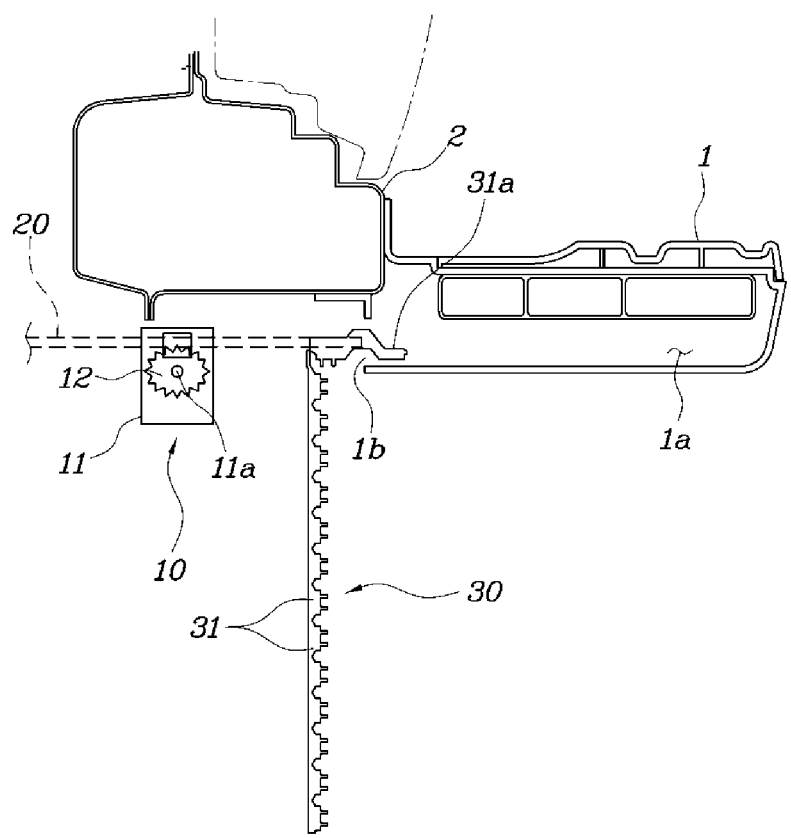
FIG. 6 is a view showing an operation of the exemplary variable deflector apparatus according to the present invention.

As shown in FIG. 2 to FIG. 6, the variable deflector apparatus for the side step of the vehicle according to the present invention includes a slide plate 20 and a side-step deflector 30. The slide plate 20 receives power from a drive device 10 to be received in and drawn out from the side step 1. The side-step deflector 30 includes a plurality of joints 31 that are connected to each other in a row to be coupled with the slide plate 20, and is foldable or unfoldable with respect to a junction of each of the joints 31. The side-step deflector 30 is received together with the slide plate 20 when it is received in the side step 1, and is drawn out together with the slide plate 20 and simultaneously separated therefrom when the slide plate 20 is drawn out from the side step 1. A drawn-out portion of the side-step deflector 30 separated from the slide plate 20 is perpendicularly deployed downwards from the side step 1, thus improving aerodynamic performance of the vehicle.

Also, the apparatus of the present invention further includes a vehicle-speed sensor 40 to implement a variable deflector, and a controller 50 receiving a signal from the vehicle-speed sensor 40 to control an operation of the drive device 10.

The drive device 10 includes a motor 11 fixedly mounted to a vehicle body 2 in an indoor direction, and a pinion gear 12 coupled to a shaft 11a of the motor 11.

The motor 11 is preferably located under the side sill panel, but is not limited thereto.

The pinion gear 12 and the slide plate 20 should be coupled with each other to allow for power transmission and thereby enable the slide plate 20 to be moved by the rotation of the pinion gear 12. To this end, a rack gear 21 is integrally formed on an underside of the slide plate 20 to engage with the pinion gear 12.

When the side-step deflector 30 is received in the side step 1, only a last joint 31a in an outdoor direction is coupled to the slide plate 20 and the remaining joints 31 maintain a close contact state with the slide plate 20 to be separable therefrom.

The side step 1 defines a receiving space 1a therein, and has at an end in the indoor direction facing the pinion gear 12 an opening 1b that is connected to the receiving space 1a. The slide plate 20 and the side-step deflector 30 are received in or drawn out through the opening 1b.

A guide groove 1c is formed on a side of each of front and rear ends in the receiving space 1a of the side step 1, in a direction where the side step 1 protrudes laterally, and the side-step deflector 30 is fitted at a side of each of front and rear ends thereof into the guide groove 1c when the side-step deflector 30 is received in or drawn out.

Further, a portion of the side-step deflector 30 fitted into the guide groove 1c is in close contact with the slide plate 20 to prevent the side-step deflector 30 from sagging. Thereby, such a configuration allows the side-step deflector 30 to be smoothly received in or drawn out.

If the side step deflector 30 does not come into close contact with the slide plate 20 and sags downwards while the side step deflector 30 is received in the side step 1, the side step deflector 30 comes into contact with a bottom of the receiving space 1a and thereby interferes therewith. In such a state, if the receiving operation and the withdrawing operation proceed, the joints 31 may be severely bent and twisted. As a result, the side step deflector 30 cannot be smoothly received in or drawn out, and may be broken in the worst case. In order to prevent the problem from occurring, the portion of the side step deflector 30 fitted into the guide groove 1c preferably comes into contact with the slide plate 20.

Meanwhile, in the side step deflector 30 according to the present invention, as a vehicle speed increases, the number of joints 31 of the side-step deflector 30 that are perpendicularly deployed downwards from the side step 1 is increased. Therefore, it is possible to optimally improve the aerodynamic performance of the vehicle.

As described above, various embodiments of the present invention provide the variable deflector apparatus, in which it is possible to improve the aerodynamic performance of the vehicle due to the deflector 30 that is drawn out from the side step 1 in a vehicle configured such that the side step 1 protrudes laterally from the vehicle body 2, thus enhancing the fuel efficiency.

Further, the present invention provides the variable deflector apparatus, in which, as the vehicle speed increases, the extent of the deflector 30 drawn out from the side step 1 is actively increased, thus optimally improving the aerodynamic performance.

The present invention is advantageous in that it is possible to improve the aerodynamic performance of a vehicle due to a deflector that is drawn out from a side step in a vehicle configured such that the side step protrudes laterally from a vehicle body, thus enhancing fuel efficiency.

Further, the present invention is advantageous in that, as a vehicle speed increases, an extent of a deflector drawn out from a side step is actively increased, thus optimally improving aerodynamic performance.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable deflector apparatus for a side step of a vehicle, comprising:
   a slide plate receiving power from a drive device to be received in and drawn out from the side step; and
   a side-step deflector comprising a plurality of joints connected to each other in a row to be coupled with the slide plate and to be folded or unfolded with respect to a junction of each of the joints,
   wherein the side-step deflector is configured to be received together with the slide plate when it is received in the side step and to be drawn out together with the slide plate and simultaneously separated therefrom when the slide plate is drawn out from the side step, and a drawn-out portion of the side-step deflector separated from the slide plate is configured to be perpendicularly deployed downwards from the side step, thus improving aerodynamic performance of the vehicle.

2. The variable deflector apparatus of claim 1, further comprising:
   a vehicle-speed sensor; and
   a controller configured to receive a signal from the vehicle-speed sensor to control an operation of the drive device.

3. The variable deflector apparatus of claim 1, wherein the drive device comprises:
   a motor fixedly mounted to a vehicle body in an indoor direction of the vehicle; and
   a pinion gear coupled to a shaft of the motor, and
   the slide plate comprises a rack gear integrally formed on an underside thereof to engage with the pinion gear.

4. The variable deflector apparatus of claim 1, wherein, when the side-step deflector is received in the side step, a last joint in an outdoor direction of the vehicle is coupled to the slide plate and the remaining joints maintain a close contact state with the slide plate to be separable therefrom.

5. The variable deflector apparatus of claim 3, wherein the side step defines a receiving space therein and has, at an end in the indoor direction facing the pinion gear, an opening that is connected to the receiving space, and the slide plate and the side-step deflector are configured to be received in or drawn out through the opening.

6. The variable deflector apparatus of claim 5, wherein a guide groove is formed on a side of each of front and rear ends in the receiving space of the side step, in a direction where the side step protrudes laterally, and the side-step deflector is fitted at a side of each of front and rear ends thereof into the guide groove when the side-step deflector is received in or drawn out, and a portion of the side-step deflector fitted into the guide groove is in close contact with the slide plate to prevent the side-step deflector from sagging.

7. The variable deflector apparatus of claim 2, wherein a number of joints of the side-step deflector that are configured to be perpendicularly deployed downwards from the side step is increased, as a vehicle speed increases.

* * * * *